United States Patent
Ma et al.

(10) Patent No.: US 9,892,550 B2
(45) Date of Patent: Feb. 13, 2018

(54) PHOTOREALISTIC RENDERING OF SCENES WITH DYNAMIC CONTENT

(71) Applicant: HERE Global B.V., Eindhoven (NL)

(72) Inventors: Xiang Ma, Chicago, IL (US); Xin Chen, Evanston, IL (US); Hang Dou, Iowa City, IA (US)

(73) Assignee: HERE Global B.V., Eindhoven (NL)

( * ) Notice: Subject to any disclaimer, the term of this patent is extended or adjusted under 35 U.S.C. 154(b) by 755 days.

(21) Appl. No.: 14/048,513

(22) Filed: Oct. 8, 2013

(65) Prior Publication Data

US 2015/0097834 A1 Apr. 9, 2015

(51) Int. Cl.
G06T 15/60 (2006.01)
G06T 17/05 (2011.01)

(52) U.S. Cl.
CPC .............. *G06T 15/60* (2013.01); *G06T 17/05* (2013.01)

(58) Field of Classification Search
USPC .................................. 345/419, 426, 581, 473
See application file for complete search history.

(56) References Cited

U.S. PATENT DOCUMENTS

| | | | | |
|---|---|---|---|---|
| 7,647,171 B2* | 1/2010 | Horvitz | ................... | G01S 19/14 340/990 |
| 8,134,556 B2* | 3/2012 | Elsberg | ................... | G06T 15/06 345/426 |
| 8,436,855 B1* | 5/2013 | Morgan | ................ | G06T 15/506 345/419 |
| 2004/0073364 A1* | 4/2004 | Jung | ....................... | G01C 21/30 701/469 |
| 2005/0212794 A1 | 9/2005 | Furukawa et al. | | |
| 2010/0254595 A1* | 10/2010 | Miyamoto | ........... | G06K 9/2036 382/159 |
| 2012/0232787 A1* | 9/2012 | Kunath | .............. | G01C 21/3461 701/423 |
| 2013/0194269 A1* | 8/2013 | Matas | ..................... | G06T 11/60 345/426 |
| 2014/0051510 A1* | 2/2014 | Benko | ..................... | A63F 13/00 463/31 |
| 2014/0267248 A1* | 9/2014 | Zou | ......................... | G06T 15/60 345/420 |
| 2014/0354672 A1* | 12/2014 | Engel | ...................... | G09G 5/02 345/589 |

OTHER PUBLICATIONS

Simon Premoze Et al: "Geospecific rendering of alpine terrain" In: "Eurographics," Jan. 1, 1999 (Jan. 1, 1999,) Springer Verlang, Vienna, AT, XP055233827, ISSN: 0946-2767 pp. 107-118, DOI: 10.1007/978-3-7091-6809-7_11.

(Continued)

*Primary Examiner* — Kimbinh T Nguyen
(74) *Attorney, Agent, or Firm* — Alston & Bird LLP (57) ABSTRACT

Methods for rendering three-dimensional photo meshes having dynamic content include: (a) detecting a shadow in a three-dimensional photo mesh; (b) removing the shadow from the three-dimensional photo mesh to form a modified photo mesh having a shadow-free texture; (c) simulating a real-time condition in the modified photo mesh; and (d) rendering an image that shows an effect of the real-time condition. Systems for rendering three-dimensional photo meshes having dynamic content are described.

20 Claims, 9 Drawing Sheets

(56) References Cited

OTHER PUBLICATIONS

Y. Li et al: "Integrated shadow removal based on photogrammerty and image analysis," International Journal of Remote Sensing, vol. 26, No. 18, Sep. 20, 2005 (Sep. 20, 2005), pp. 3911-3929, XP055233813, GB ISSN: 0143-1161, DOI: 10.1080/01431160500159347.

European Office action for related European Application No. 14182054.8, dated Dec. 14, 2015.

* cited by examiner

PHOTOREALISTIC RENDERING OF SCENES WITH DYNAMIC CONTENT

TECHNICAL FIELD

The present teachings relate generally to three-dimensional photo meshes and, in some embodiments, to three-dimensional photo meshes of city models.

BACKGROUND

Digital representations of the earth's surface—particularly though not exclusively in urban areas—are useful in a variety of applications. By way of example, representative applications of three-dimensional (3D) city models include but are not limited to navigation systems, intelligent transportation systems, urban planning, enhanced city visualization (e.g. virtual tours, tourism, etc.), noise modeling, thermographic building inspections, and the like.

One type of 3D city model is based on a photo mesh. In the field of computer graphics, a "mesh" refers to a collection of elements—for example, vertices, edges, and faces—that together define the structural shape of a polyhedral object (e.g., a building). A "photo mesh" may be derived from a mesh by mapping texture (e.g., color, etc.) onto the faces of the mesh to provide a photorealistic scene.

In constructing a photo mesh, the aerial image of an area of interest is first acquired from multiple angles. The aerial images thus obtained are then processed using a computer vision algorithm in a technique known as 3D reconstruction. Since the aerial images are acquired at certain times of the day, the images themselves are static and may contain various features that are fixed, such as light, shadows, weather conditions, and the like. The shadows present in the aerial images will likewise be present in the 3D model derived from the aerial images. The presence of these shadows in a 3D photo mesh may be problematic, especially if a scene is to be re-rendered with a different light source (e.g., to depict a scene at a different time of day than the time at which the aerial images were acquired). Ideally, in order to render a more realistic scene, the shadow in the photo mesh should be removed prior to relighting a scene. However, there is no method to remove shadows from 3D photo meshes. Rather, the field of computer vision focuses instead on 2D images in which shadow regions may be detected based on various metrics. Such techniques based on 2D structures of a scene may be inaccurate and unreliable.

SUMMARY

The scope of the present invention is defined solely by the appended claims, and is not affected to any degree by the statements within this summary.

By way of introduction, a method in accordance with the present teachings includes: (a) detecting, by a processor, a shadow in a three-dimensional photo mesh; (b) removing, by the processor, the shadow from the three-dimensional photo mesh to form a modified photo mesh having a shadow-free texture; (c) simulating, by the processor, a real-time condition in the modified photo mesh; and (d) rendering, by the processor, an image that shows an effect of the real-time condition.

A first apparatus in accordance with the present teachings includes at least one processor and at least one memory including computer program code for one or more programs. The at least one memory and the computer program code are configured to, with the at least one processor, cause the apparatus to perform at least the following: (a) detect a shadow in a three-dimensional photo mesh; (b) remove the shadow from the three-dimensional photo mesh to form a modified photo mesh having a shadow-free texture; (c) simulate a real-time condition in the modified photo mesh; and (d) render an image that shows an effect of the real-time condition.

A second apparatus in accordance with the present teachings includes (a) means for detecting a shadow in a three-dimensional photo mesh; (b) means for removing the shadow from the three-dimensional photo mesh to form a modified photo mesh having a shadow-free texture; (c) means for simulating a real-time condition in the modified photo mesh; and (d) means for rendering an image that shows an effect of the real-time condition.

A non-transitory computer readable storage medium in accordance with the present teachings has stored therein data representing instructions executable by a programmed processor. The storage medium includes instructions for (a) detecting a shadow in a three-dimensional photo mesh; (b) removing the shadow from the three-dimensional photo mesh to form a modified photo mesh having a shadow-free texture; (c) simulating a real-time condition in the modified photo mesh; and (d) rendering an image that shows an effect of the real-time condition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Efficient and accurate methods to erase shadows from images have been sought for decades. The detection of shadows in images is a first step in their removal. Conventional techniques approach the problem of shadow detection from image space (e.g., 2D), which results in non-robust performance for scenes with arbitrary complexity that lack specific context information. As further described below, it has been discovered that shadow masks may be generated for real world large city meshes by simulating direct illumination. In contrast to conventional 2D image-based methodology, no context assumptions are needed and methods in accordance with the present teachings may be applied for both tiled textures and non-tiled textures.

Techniques for removing shadows from 3D photo meshes to facilitate photorealistic 4D rendering of scenes (e.g., cities) with time lapse have been discovered and are described herein. In accordance with the present teachings, shadows in a 3D photo mesh may be detected and removed (e.g., by image filters). The shadow-free 3D scene thus obtained may be relit/re-shadowed to depict a desired time of day, season of year, weather conditions, and/or the like. Thus, in accordance with the present teachings, a 3D photo mesh may be provided that includes real-time dynamic content.

With a conventional 3D photo mesh, there is no way to depict a cityscape at a different time and/or under different conditions (e.g., weather, traffic, etc.) unless new aerial images corresponding to the different time and/or different conditions are somehow obtained. By contrast, in accordance with the present teachings, all manner of variations of dynamic content—including but not limited to time of day, day of year, season, weather conditions, traffic (e.g., automobile and/or pedestrian), and/or the like—may be integrated into a 3D photo mesh of a given scene without requiring new aerial images of the scene.

The ability to convey dynamic content in a 3D photo mesh may provide various advantages including but not limited to granting a user immediate access to substantially real-time, visually discernible information upon opening a 3D map. For example, upon opening a 3D map—which, in some embodiments, may be provided as part of a navigation system (e.g., in an automobile, a smart phone app, and/or the like)—a user may immediately observe a scene that mimics the actual real-time conditions in the environs of the scene (e.g., weather, lighting, traffic, and/or the like). Thus, by way of example, a user may discover that it is raining in a certain area just by opening a 3D map of that area, without requesting or reading any supplemental textual information regarding current weather conditions for the area.

Methods in accordance with the present teachings use a 3D structure to first detect and then remove a shadow in a two-stage process. Heretofore, the 3D structure of a city has never been used to cast a shadow and then remove the shadow. 3D information is much more accurate than 2D information since the former is based on actual physics. For example, since the height of a building may be known, an artificial light source that mimics the position of the sun may be created. If the time of day is known, the exact position of the sun may be calculated. Next, the shadow may be recast based on the light source, and an artificial shadow that resembles the actual shadow on the image may be created. In this manner, a shadow may be identified with accuracy. Once the location of a shadow is accurately known, the shadow may then be removed, as described below.

It is to be understood that elements and features of the various representative embodiments described below may be combined in different ways to produce new embodiments that likewise fall within the scope of the present teachings.

Figure 1:
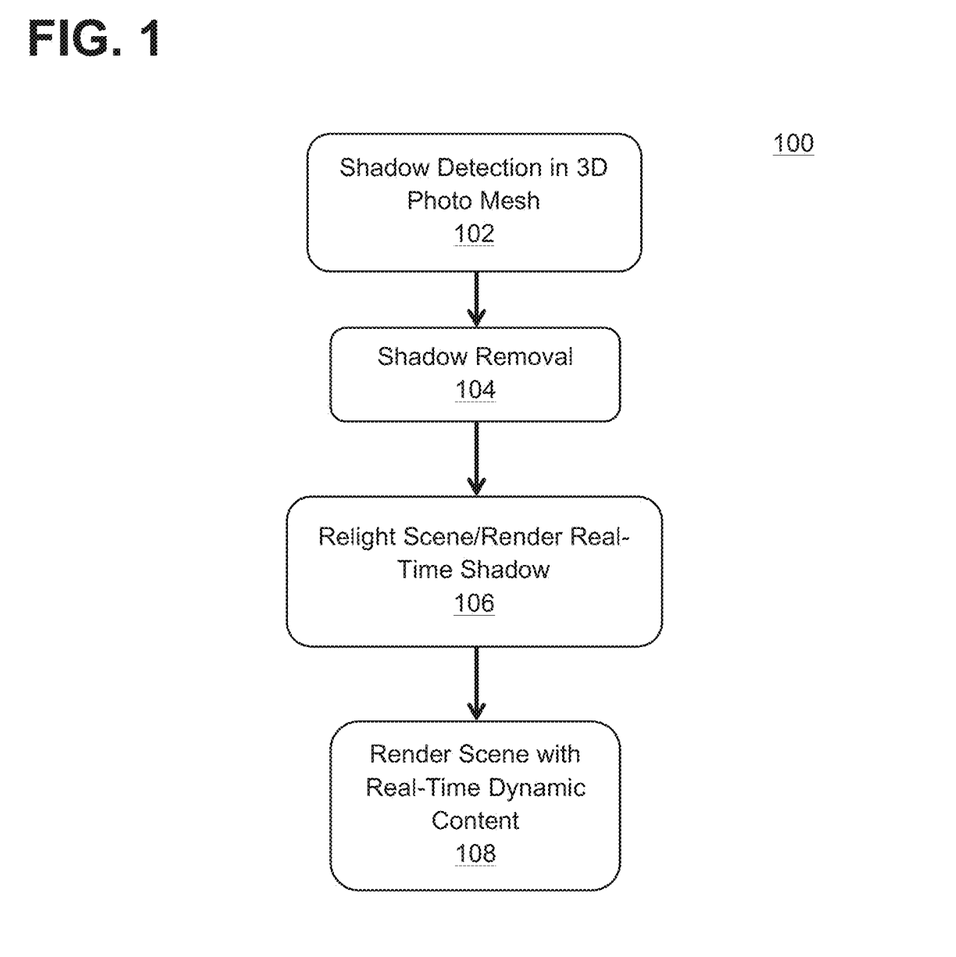
FIG. 1 shows a flow chart of an exemplary process for rendering three-dimensional photo meshes having dynamic content.

By way of general introduction, as shown in FIG. 1, a method 100 in accordance with the present teachings for rendering three-dimensional photo meshes having dynamic content includes: (a) detecting 102 a shadow in a three-dimensional photo mesh; (b) removing 104 the shadow from the three-dimensional photo mesh to form a modified photo mesh having a shadow-free texture; (c) simulating 106 a real-time condition in the modified photo mesh; and (d) rendering 108 an image that shows an effect of the real-time condition.

In some embodiments, the three-dimensional photo mesh comprises a tiled texture. In some embodiments, the three-dimensional photo mesh comprises a non-tiled texture. In some embodiments, the three-dimensional photo mesh depicts a city model.

Figure 2:
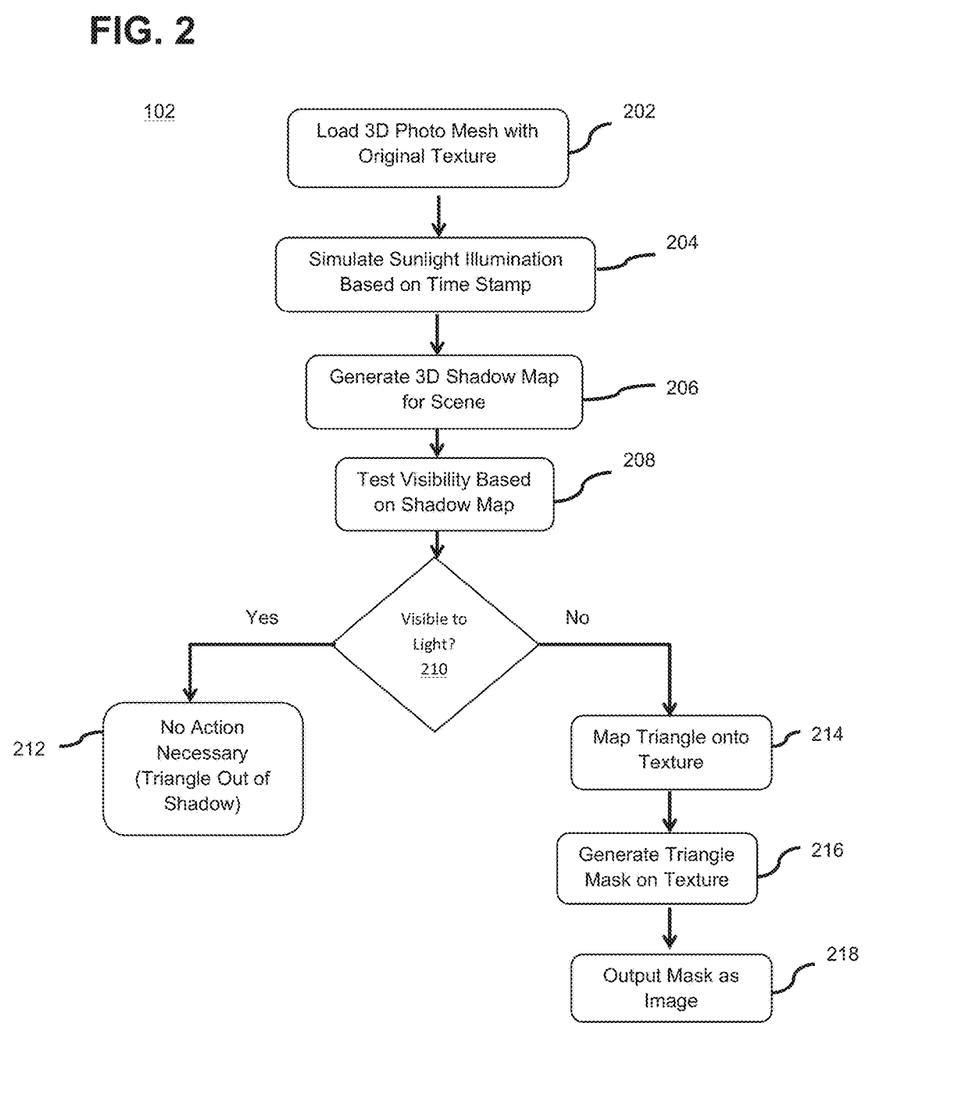
FIG. 2 shows a flow chart of an exemplary process for detecting shadows in a three-dimensional photo mesh.

The act 102 of detecting a shadow in a 3D photo mesh in accordance with the present teachings may be implemented in a variety of ways. FIG. 2 shows an overview of a representative embodiment for detecting shadows in accordance with the present teachings. As shown in FIG. 2, the act 102 of detecting a shadow may include: (a) loading 202 a 3D photo mesh with its original texture; (b) simulating 204 sunlight illumination (e.g., based on a time stamp) to determine a position of a light source; (c) creating 206 a directional shadow map based on the determined position; and (d) testing 208 light visibility of a polygon of the texture based on the directional shadow map. In some embodiments, a texture of the three-dimensional photo mesh comprises a plurality of polygons (e.g., triangles, quadrilaterals, convex polygons, concave polygons, polygons with holes, and/or the like, and combinations thereof). In some embodiments, a texture of the three-dimensional photo mesh comprises a plurality of triangles.

In some embodiments, the determining of the position of the light source (e.g., to simulate sunlight illumination) is based on a position of the shadow in the original texture of the 3D photo mesh. In other embodiments, the determining of the position of the light source is based on knowledge of a time stamp of the texture of the 3D photo mesh. In some embodiments, the image of the shadow mask includes a plurality of colors and, in some embodiments, each of the colors independently represents information such as the presence of a shadow, the non-presence of a shadow, the type of shadow, and/or the like, and combinations thereof. Different types of shadows include shadows on the ground, shadows that are not on the ground (e.g., on a surface of a building, tree, etc.), and/or the like, and combinations thereof.

At decision block 210 in FIG. 2, a determination is made as to whether a polygon (e.g., a triangle) of the texture is visible to light. If the answer is "yes," no action is needed since the triangle is out of the shadow, as shown at block 212. If the answer is "no," the polygon (e.g., a triangle) is mapped onto the texture as shown at block 214. At block 216, a shadow mask representing a shadowed area in the texture is generated. At block 218, the shadow mask is output as an image.

Figure 3:
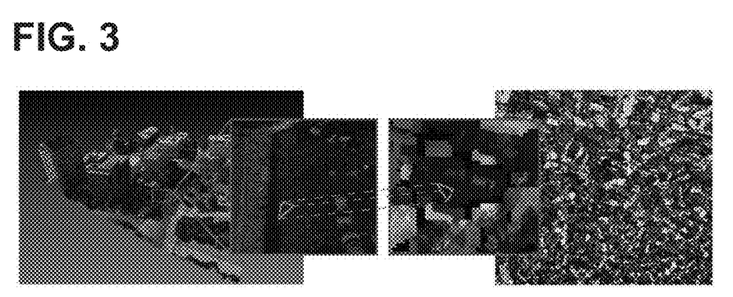
FIG. 3 shows a three-dimensional photo mesh of a city model that contains triangles (left), and a tiled texture image of the three-dimensional photo mesh (right).

FIG. 3 shows an example of mapping 214 a triangle onto a texture. The image on the left of FIG. 3 is a 3D photo mesh (e.g., a 3D city model) that contains triangles. The image on the right of FIG. 3 shows a tiled texture image of the 3D photo mesh. Each vertex of the triangle maps to a unique coordinate on the texture. By checking the visibility of the triangles under sunlight simulation, a mask highlighting shadowed areas on the 2D texture may be generated.

Figure 4:
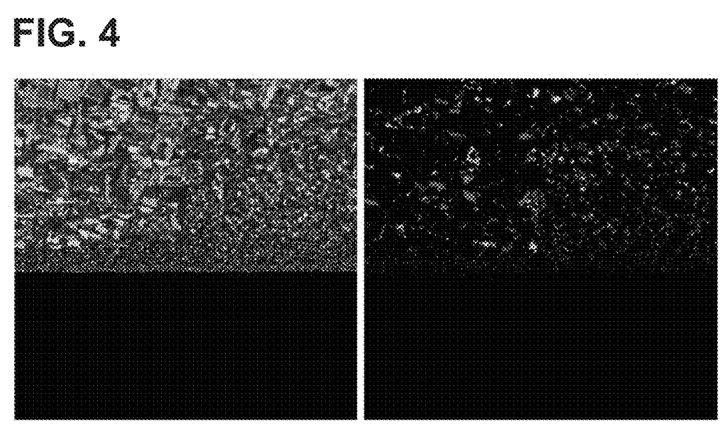
FIG. 4 shows a texture of a three-dimensional photo mesh (left) and an output mask for the three-dimensional photo mesh texture (right).

FIG. 4 shows an example of outputting 218 a shadow area mask. The image on the left of FIG. 4 shows the original texture of a 3D photo mesh. The image on the right of FIG. 4 shows an output mask for the 3D photo mesh texture. In the right-hand image in FIG. 4, black areas represent shadow-free regions, red areas represent shadows on the ground, and yellow areas represent shadows that are not on the ground (e.g. on the surfaces of buildings, trees, etc.).

The act 102 of shadow detecting shown in FIG. 1 may be regarded as an inverse process of shadow casting. Given a city mesh with shadowed textures (compact tiled or non-tiled), the goal is to produce masks representing shadowed areas in those textures. First, the scene is rendered with original shadowed textures. Next, based on the observation that sunlight is directional light for an entire city area, the light direction may be probed and a shadow map may be generated. Finally, the city mesh is processed and the shadowed areas are masked out in the corresponding texture.

The virtual light source may be manually moved to estimate the correct light direction based on target shadows. Alternatively, or in addition, the correct light direction may be determined based on a pre-knowledge of the time stamp of a given texture. A Shader program, such as Geometry Shader (www.OpenGL.org) may be used to assemble triangles and render them as masks in the fragment shader. In some embodiments, the output masks may be PNG files, resulting from the trade-off between storage, post-processing speed, and image quality.

In terms of implementation, a representative prototype of an algorithm with tiled city meshes as input and PNG mask images as output has been developed. The representative program has the following dependencies:

OpenGL (version higher than 4.0)
IGLU (Iowa OpenGL Utilities from Chris Wyman, University of Iowa)
IGLU depends on fltk, ffmpeg opengl and glew.
The environment setup includes the following:
OpenGL 4.0 or higher (comes directly with NVIDIA graphics driver)
IGLU (downloadable from http://homepage.divms.uiowa.edu/~cwyman/demos.html)
fltk-1.3.0 (downloadable from http://www.fltk.org/software.php)
ffmpeg (downloadable from http://ffmpeg.org/download.html)
glew (downloadable from http://glew.sourceforge.net/index.html)
GLSL shaders, input textures, and output mask images may be put in the program working directory (debug folder).

Figure 5:
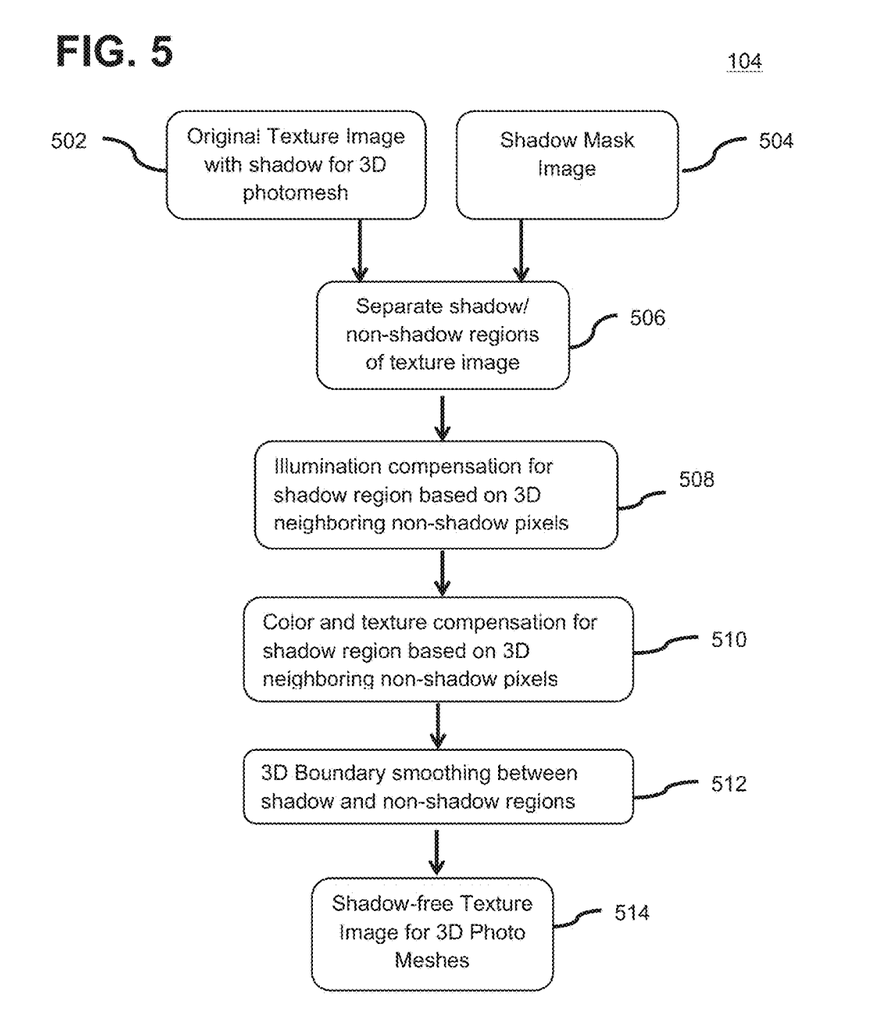
FIG. 5 shows a flow chart of an exemplary process for removing shadow from a three-dimensional photo mesh.

The act 104 of removing a shadow from a 3D photo mesh in accordance with the present teachings shown in FIG. 1 may be implemented in a variety of ways. FIG. 5 shows an overview of a representative embodiment for removing shadows in accordance with the present teachings. As shown in FIG. 5, the act 104 of removing a shadow may include: (a) separating 506 a shadow region from a non-shadow region in a texture 502 of a 3D photo mesh based on a shadow mask image 504; (b) compensating 508 for illumination in the shadow region based on a neighboring non-shadow pixel; (c) compensating 510 for color and/or texture in the shadow region based on a neighboring non-shadow pixel; and (d) smoothing 512 a boundary between the shadow region and the non-shadow region, thereby producing a shadow-free texture image for a 3D photo mesh (or, more generally, a 3D model) as shown at block 514.

Figure 6:
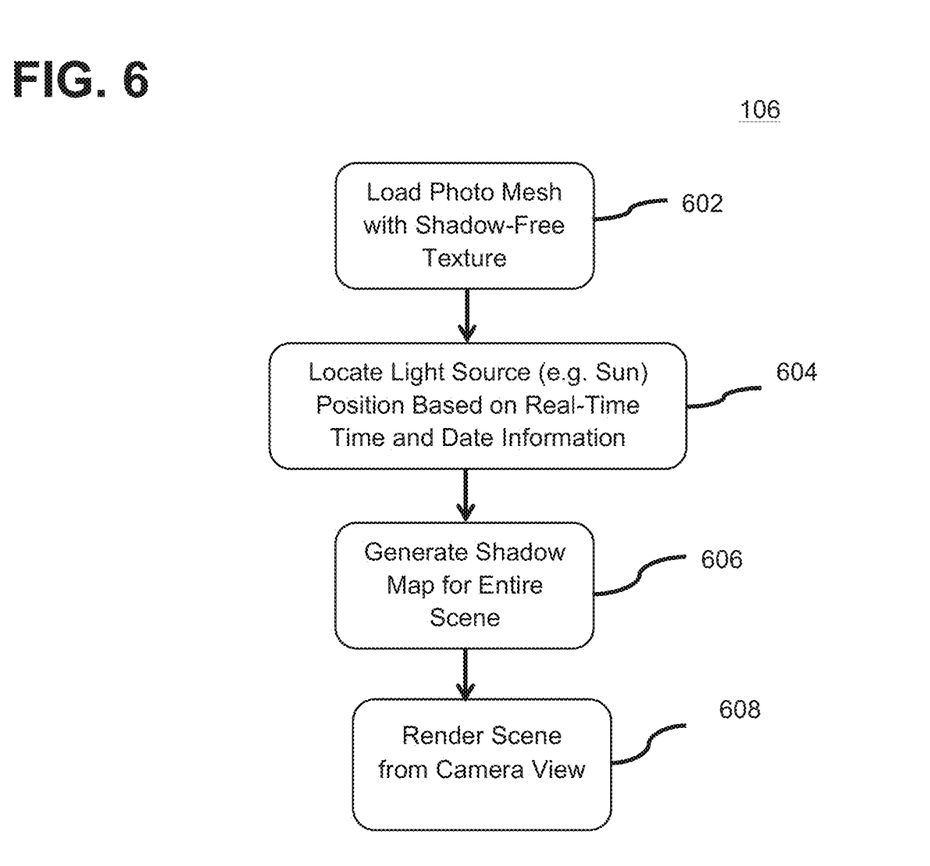
FIG. 6 shows a flow chart of an exemplary process for relighting a scene/rendering a real-time shadow.

The act 106 of simulating a real-time condition in accordance with the present teachings may be implemented in a variety of ways. In some embodiments, the simulating 106 of a real-time condition shown in FIG. 1 includes relighting a scene to generate a shadow map for the modified photo mesh. FIG. 6 shows an overview of a representative embodiment for relighting/re-shadowing in accordance with the present teachings. As shown in FIG. 6, the act 106 of relighting/re-shadowing may include (a) loading 602 a 3D photo mesh with a shadow-free texture; (b) locating 604 a light source position (e.g., based on real-time time and date information); (c) generating 606 a shadow map for the entire scene; and (d) rendering 608 the scene from camera view.

In some embodiments, the real-time condition is variable based on a parameter such as time of day, day of year, season of year, weather conditions, and/or the like, and combinations thereof. As shown in FIG. 6, in some embodiments, the real-time condition includes lighting. In other embodiments, the real-time condition is based on other information in addition to or alternatively to lighting. In some embodiments, this other information may include weather conditions, traffic (e.g., pedestrian and/or automobile), and/or the like, and combinations thereof.

Figure 7:
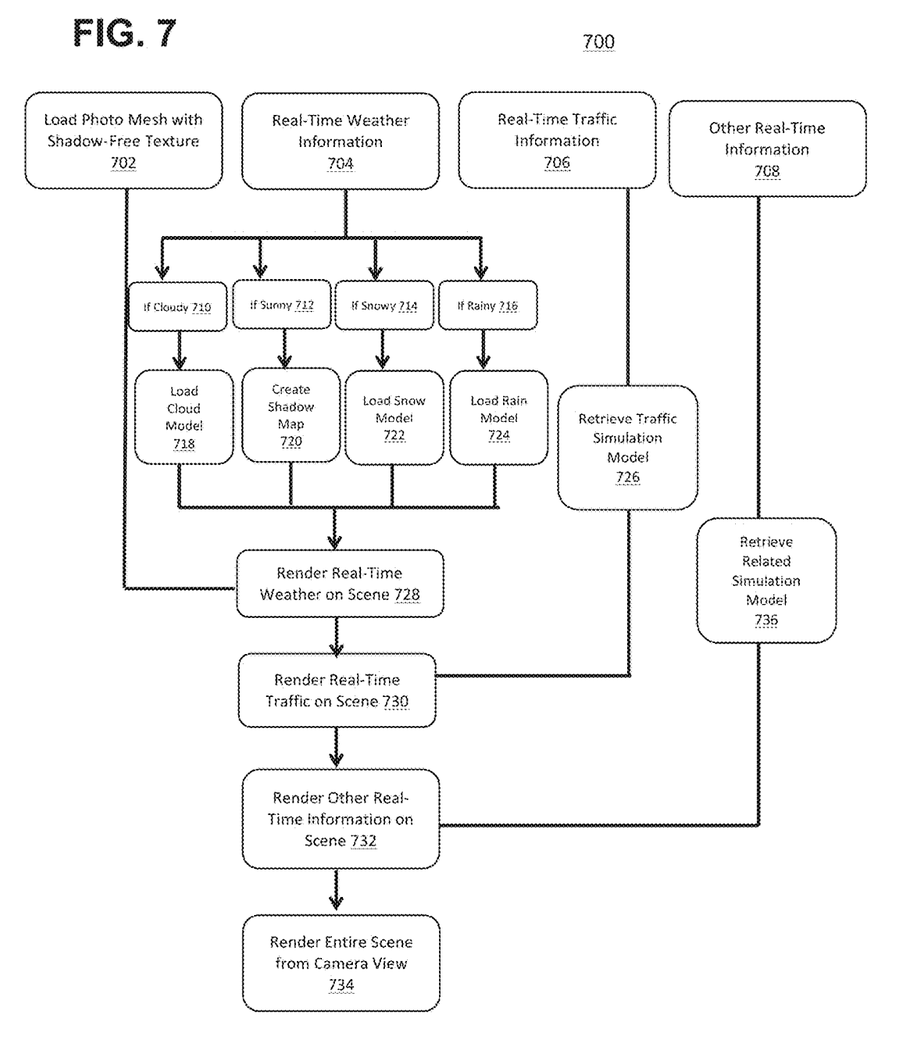
FIG. 7 shows a flow chart of an exemplary process for rendering other real-time dynamic content (e.g., weather, traffic, etc.).

FIG. 7 shows an overview of a representative embodiment for simulating 700 real-time conditions such as weather patterns, traffic, and other real-time information in accordance with the present teachings. As shown in FIG. 7, the simulating 700 may include (a) loading 702 a photo mesh with a shadow-free texture; (b) rendering 728 real-time weather dynamic content based on real-time weather information 704 and a weather simulation model; (c) rendering 730 real-time traffic dynamic content based on real-time traffic information 706 and a traffic simulation model 726; and (d) rendering 732 other real-time dynamic content based on other real-time information 708 and a related simulation model 736. As shown in FIG. 7, the weather simulation model used in the act 728 of rendering real-time weather dynamic content includes decision paths 710, 712, 714, and 716, which are selected based on whether conditions are cloudy, sunny, snowy, or rainy, respectively. Corresponding simulation models 718, 720, 722, and 724 load cloud models, create shadow maps, load snow models, and load rain models, respectively.

Figure 8:
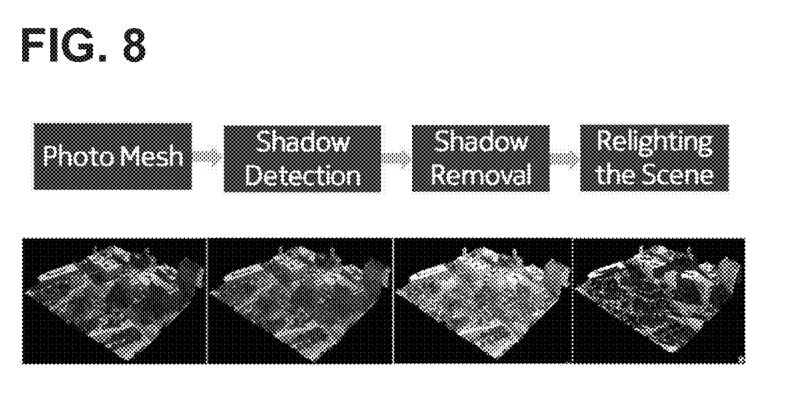
FIG. 8 shows images corresponding to the representative acts outlined in the flow chart of FIG. 1.

FIG. 8 shows images corresponding to the representative acts outlined in the flow chart of FIG. 1. After generating masks, a simple scene relighting is achieved by adjusting illumination based on the texture's HSV feature.

It is to be understood that the relative ordering of some acts shown in the flow charts of FIGS. 1, 2, and 5-7 is meant to be merely representative rather than limiting, and that alternative sequences may be followed. Moreover, it is likewise to be understood that additional, different, or fewer acts may be provided, and that two or more of these acts may occur sequentially, substantially contemporaneously, and/or in alternative orders.

In some embodiments, a method in accordance with the present teachings for rendering three-dimensional photo meshes having dynamic content is implemented using a computer and, in some embodiments, one or a plurality of the above-described acts are performed by one or a plurality of processors. In some embodiments, one or more of the one or the plurality of processors include graphics processing units (GPUs). In other embodiments, one or more of the one or the plurality of processors include central processing units (CPUs). In some embodiments, methods in accordance with the present teachings are implemented entirely on GPUs. In some embodiments, GPUs provide improved and/or faster performance.

In some embodiments, as described above, the present teachings provide methods for rendering three-dimensional photo meshes having dynamic content. In other embodiments, as further described below, the present teachings also provide apparatuses for rendering three-dimensional photo meshes having dynamic content.

Figure 9:
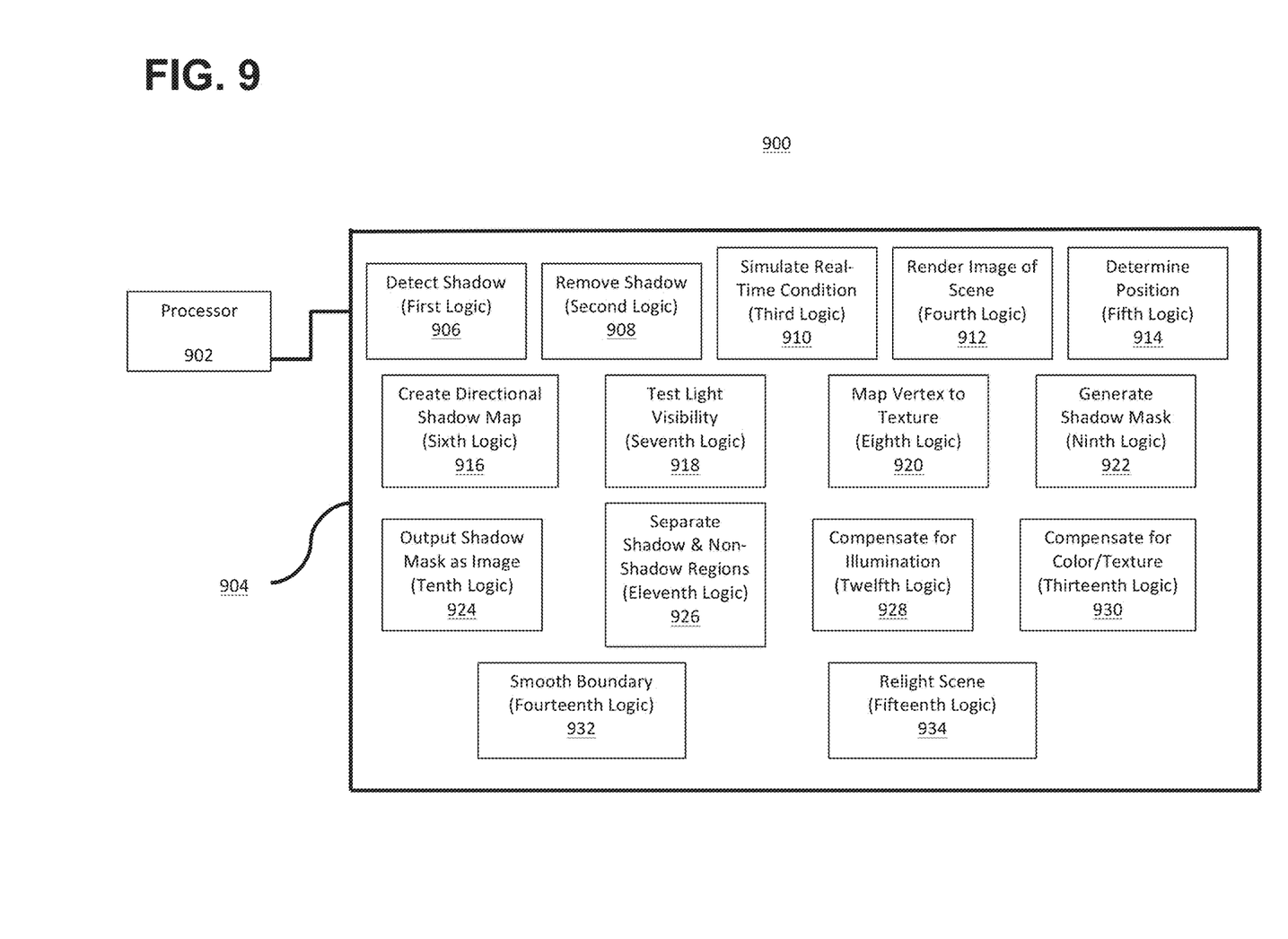
FIG. 9 shows a block diagram of a representative apparatus 900 in accordance with the present teachings for rendering three-dimensional photo meshes having dynamic content.

FIG. 9 shows a block diagram of a representative first apparatus 900 in accordance with the present teachings for rendering three-dimensional photo meshes having dynamic content. In some embodiments, as shown in FIG. 9, an apparatus 900 in accordance with the present teachings is implemented as part of a GPU in a computer system. In other embodiments, the apparatus 900 may be implemented as part of a CPU in a computer system.

In some embodiments, as shown in FIG. 9, the apparatus 900 may include: a processor 902; a non-transitory memory 904 coupled with the processor 902; first logic 906 stored in the non-transitory memory 904 and executable by the processor 902 to cause the apparatus 900 to detect a shadow in a three-dimensional photo mesh; second logic 908 stored in the non-transitory memory 904 and executable by the processor 902 to cause the apparatus 900 to remove the shadow from the three-dimensional photo mesh to form a modified photo mesh having a shadow-free texture; third logic 910 stored in the non-transitory memory 904 and executable by the processor 902 to cause the apparatus 900 to simulate a real-time condition in the modified photo mesh; and fourth logic 912 stored in the non-transitory memory 904 and executable by the processor 902 to cause the apparatus 900 to render an image that shows an effect of the real-time condition.

In some embodiments, the apparatus 900 may further include one or more of the following: fifth logic 914 stored in the non-transitory memory 904 and executable by the processor 902 to cause the apparatus 900 to determine a position of a light source; sixth logic 916 stored in the non-transitory memory 904 and executable by the processor 902 to cause the apparatus 900 to create a directional shadow map based on the determined position; seventh logic 918 stored in the non-transitory memory 904 and executable by the processor 902 to cause the apparatus 900 to test light visibility of a polygon of a texture of the three-dimensional photo mesh based on the directional shadow map; eighth logic 920 stored in the non-transitory memory 904 and executable by the processor 902 to cause the apparatus 900 to map a vertex of the polygon to unique coordinates of the texture; ninth logic 922 stored in the non-transitory memory 904 and executable by the processor 902 to cause the apparatus 900 to generate a shadow mask representing a shadowed area in the texture; tenth logic 924 stored in the non-transitory memory 904 and executable by the processor 902 to cause the apparatus 900 to output the shadow mask as an image; eleventh logic 926 stored in the non-transitory memory 904 and executable by the processor 902 to cause the apparatus 900 to separate a shadow region from a non-shadow region in the texture; twelfth logic 928 stored in the non-transitory memory 904 and executable by the processor 902 to cause the apparatus 900 to compensate for illumination in the shadow region based on a neighboring non-shadow pixel; thirteenth logic 930 stored in the non-transitory memory 904 and executable by the processor 902 to cause the apparatus 900 to compensate for color and/or texture in the shadow region based on a neighboring non-shadow pixel; fourteenth logic 932 stored in the non-transitory memory 904 and executable by the processor 902 to cause the apparatus 900 to smooth a boundary between the shadow region and the non-shadow region; and/or fifteenth logic 934 stored in the non-transitory memory 904 and executable by the processor 902 to cause the apparatus 900 to relight a scene to generate a shadow map for the modified photo mesh.

In some embodiments, the apparatus 900 is configured as a device selected from the group consisting of navigation systems, mobile phones, personal computers, game consoles, laptops, notebooks, tablets, portable media players, personal digital assistants, pagers, and the like, and combinations thereof. In some embodiments, the apparatus 900 is configured as a navigation system and/or a mobile phone and further includes: (a) user interface circuitry and user interface software configured to (i) facilitate user control of at least some functions of the navigation system and/or mobile phone though use of a display and (ii) respond to user inputs; and (b) a display and display circuitry configured to display at least a portion of a user interface of the navigation system and/or mobile phone, the display and the display circuitry configured to facilitate user control of at least some of the functions of the navigation system and/or mobile phone.

A second apparatus for rendering three-dimensional photo meshes having dynamic content in accordance with the present teachings includes (a) means for detecting a shadow in a three-dimensional photo mesh; (b) means for removing the shadow from the three-dimensional photo mesh to form a modified photo mesh having a shadow-free texture; (c) means for simulating a real-time condition in the modified photo mesh; and (d) means for rendering an image that shows an effect of the real-time condition.

A non-transitory computer-readable storage medium in accordance with the present teachings has stored therein data representing instructions executable by a programmed processor for showing a relationship between a sent electronic message and a received electronic message in a text messaging conversation. The storage medium includes instructions for: (a) detecting a shadow in a three-dimensional photo mesh; (b) removing the shadow from the three-dimensional photo mesh to form a modified photo mesh having a shadow-free texture; (c) simulating a real-time condition in the modified photo mesh; and (d) rendering an image that shows an effect of the real-time condition.

One skilled in the art will appreciate that one or more modules or logic described herein may be implemented using, among other things, a tangible computer-readable medium comprising computer-executable instructions (e.g., executable software code). Alternatively, modules may be implemented as software code, firmware code, hardware, and/or a combination of the aforementioned.

Figure 10:
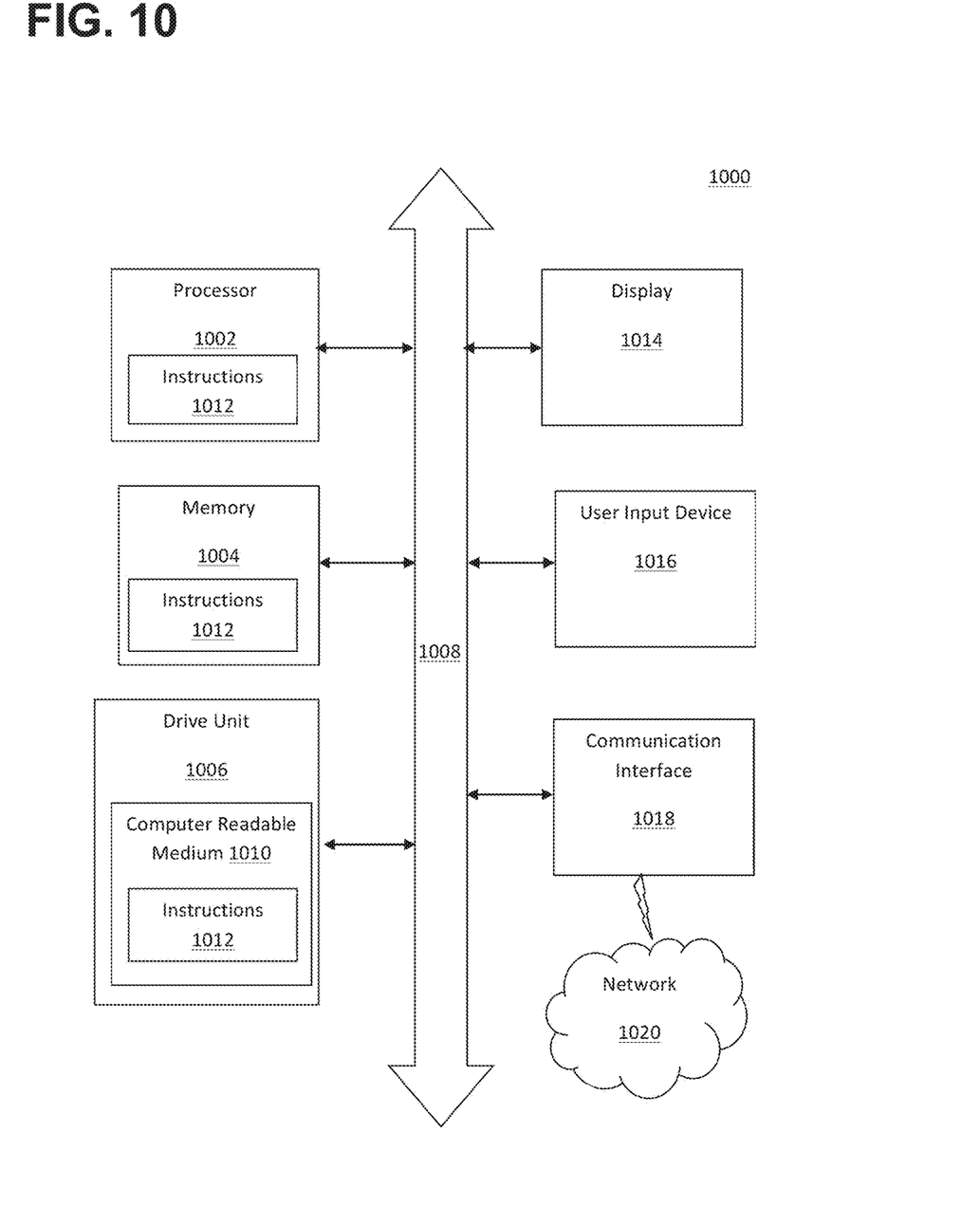
FIG. 10 shows a representative general computer system 1000 for use with an apparatus in accordance with the present teachings.

FIG. 10 depicts an illustrative embodiment of a general computer system 1000. The computer system 1000 can include a set of instructions that can be executed to cause the computer system 1000 to perform any one or more of the methods or computer based functions disclosed herein. The computer system 1000 may operate as a standalone device or may be connected (e.g., using a network) to other computer systems or peripheral devices. Any of the components discussed above, such as the processor, may be a computer system 1000 or a component in the computer system 1000. The computer system 1000 may implement a rendering module for rendering three-dimensional photo meshes having dynamic content, of which the disclosed embodiments are a component thereof.

In a networked deployment, the computer system 1000 may operate in the capacity of a server or as a client user computer in a client-server user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As shown in FIG. 10, the computer system 1000 may include a processor 1002, for example a central processing unit (CPU), a graphics-processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In some embodiments, the memory 1004 includes a cache or random access memory for the processor 1002. In alternative embodiments, the memory 1004 is separate from the processor 1002, such as a cache memory of a processor, the system memory, or other memory. The memory 1004 may be an external storage device or database for storing data. Examples include a hard drive, compact disc (CD), digital video disc (DVD), memory card, memory stick, floppy disc, universal serial bus (USB) memory device, or any other device operative to store data. The memory 1004 is operable to store instructions executable by the processor 1002. The functions, acts or tasks illustrated in the figures or described herein may be performed by the programmed processor 1002 executing the instructions 1012 stored in the memory 1004. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown in FIG. 10, the computer system 1000 may further include a display unit 1014, such as a liquid crystal display (LCD), an organic light emitting diode (OLED), a flat panel display, a solid state display, a cathode ray tube (CRT), a projector, a printer or other now known or later developed display device for outputting determined information. The display 1014 may act as an interface for the user to see the functioning of the processor 1002, or specifically as an interface with the software stored in the memory 1004 or in the drive unit 1006.

Additionally, as shown in FIG. 10, the computer system 1000 may include an input device 1016 configured to allow a user to interact with any of the components of system 1000. The input device 1016 may be a number pad, a keyboard, or a cursor control device, such as a mouse, or a joystick, touch screen display, remote control or any other device operative to interact with the system 1000.

In some embodiments, as shown in FIG. 10, the computer system 1000 may also include a disk or optical drive unit 1006. The disk drive unit 1006 may include a computer-readable medium 1010 in which one or more sets of instructions 1012 (e.g., software) can be embedded. Further, the instructions 1012 may embody one or more of the methods or logic as described herein. In some embodiments, the instructions 1012 may reside completely, or at least partially, within the memory 1004 and/or within the processor 1002 during execution by the computer system 1000. The memory 1004 and the processor 1002 also may include computer-readable media as described above.

The present teachings contemplate a computer-readable medium that includes instructions 1012 or receives and executes instructions 1012 responsive to a propagated signal, so that a device connected to a network 1020 can communicate voice, video, audio, images or any other data over the network 1020. Further, the instructions 1012 may be transmitted or received over the network 1020 via a communication interface 1018. The communication interface 1018 may be a part of the processor 1002 or may be a separate component. The communication interface 1018 may be created in software or may be a physical connection in hardware. The communication interface 1018 is configured to connect with a network 1020, external media, the display 1014, or any other components in system 1000, or combinations thereof. The connection with the network 1020 may be a physical connection, such as a wired Ethernet connection or may be established wirelessly as discussed below. Likewise, the additional connections with other components of the system 1000 may be physical connections or may be established wirelessly.

The network 1020 may include wired networks, wireless networks, or combinations thereof. The wireless network may be a cellular telephone network, an 802.11, 802.16, 802.20, or WiMax network. Further, the network 1020 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of subject matter described in this specification can be implemented as one or more computer program products, for example, one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatuses, devices, and machines for processing data, including but not limited to, by way of example, a programmable processor, a computer, or multiple processors or computers. The apparatus can include, in addition to hardware, code that creates an execution environment for the computer program in question (e.g., code that constitutes processor firmware, a protocol stack, a database management system, an operating system, or a combination thereof).

In some embodiments, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the present teachings are considered to include any one or more of a computer-readable medium or a distribution medium and other equivalents and successor media, in which data or instructions may be stored.

In some embodiments, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In some embodiments, the methods described herein may be implemented by software programs executable by a computer system. Further, in some embodiments, implementations can include distributed processing, component/object distributed processing, and parallel processing. Alternatively, virtual computer system processing can be constructed to implement one or more of the methods or functionality as described herein.

Although the present teachings describe components and functions that may be implemented in particular embodiments with reference to particular standards and protocols, the present invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The main elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio player, a Global Positioning System (GPS) receiver, to name just a few. Computer-readable media suitable for storing computer program instructions and data include all forms of non volatile memory, media and memory devices, including but not limited to, by way of example, semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

To provide for interaction with a user, some embodiments of subject matter described herein can be implemented on a device having a display, for example a CRT (cathode ray tube) or LCD (liquid crystal display) monitor, for displaying information to the user and a keyboard and a pointing device, for example a mouse or a trackball, by which the user can provide input to the computer. Other kinds of devices can be used to provide for interaction with a user as well. By way of example, feedback provided to the user can be any form of sensory feedback (e.g., visual feedback, auditory feedback, or tactile feedback); and input from the user can be received in any form, including but not limited to acoustic, speech, or tactile input.

Embodiments of subject matter described herein can be implemented in a computing system that includes a back-end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include but are not limited to a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 CFR §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A method comprising:
   detecting, by a processor, a shadow in a three-dimensional photo mesh including one or more polyhedral objects and defined according to a photographic image;
   removing, by the processor, the shadow from the three-dimensional photo mesh to form a modified photo mesh having a shadow-free texture;
   receiving data indicative of a real-time weather condition;
   receiving a time stamp for a current time;
   simulating, by the processor, the real-time weather condition in the modified photo mesh to graphically represent the real-time weather condition;
   calculating an artificial shadow based on the time stamp for the current time; and
   rendering, by the processor, an image that shows an effect of the real-time weather condition and the artificial shadow.

2. The method of claim 1 wherein the three-dimensional photo mesh comprises a tiled texture.

3. The method of claim 1 wherein the three-dimensional photo mesh comprises a non-tiled texture.

4. The method of claim 1 wherein the three-dimensional photo mesh depicts a city model including the one or more polyhedral objects.

5. The method of claim 1 wherein a texture of the three-dimensional photo mesh comprises a plurality of polygons.

6. The method of claim 5 wherein the detecting of the shadow comprises: determining a position of a light source;
creating a directional shadow map based on the determined position;
testing light visibility of a polygon of the texture based on the directional shadow map;
mapping a vertex of the polygon to unique coordinates of the texture;
generating a shadow mask representing a shadowed area in the texture;
and outputting the shadow mask as an image.

7. The method of claim 6 wherein the determining of the position of the light source is based on a position of the shadow in the three-dimensional photo mesh.

8. The method of claim 6 wherein the determining of the position of the light source is based on knowledge of a time stamp of the texture of the three-dimensional photo mesh.

9. The method of claim 6 wherein the image of the shadow mask comprises a plurality of colors, and wherein each of the colors independently represents information selected from the group consisting of presence of a shadow, non-presence of a shadow, type of shadow, and combinations thereof.

10. The method of claim 1, wherein removing of the shadow comprises:
separating a shadow region from a non-shadow region in a texture of the three-dimensional photo mesh;
compensating for illumination in the shadow region based on a neighboring non-shadow pixel;
compensating for color and texture in the shadow region based on a neighboring non-shadow pixel; and
smoothing a boundary between the shadow region and the non-shadow region.

11. The method of claim 1 wherein the simulating of the real-time condition comprises: relighting a scene to generate a shadow map for the modified photo mesh.

12. The method of claim 1 wherein the real-time condition is variable based on a parameter selected from the group consisting of time of day, day of year, season of year, weather conditions, and combinations thereof.

13. The method of claim 1 wherein the real-time condition comprises lighting, weather, traffic, or combinations thereof.

14. The method of claim 1, wherein the real-time weather condition is defined according to a cloud model, a snow model, or a rain model.

15. An apparatus comprising:
at least one processor; and
at least one memory including computer program code for one or more programs, the
at least one memory and the computer program code configured to, with the at least one processor, cause the apparatus to perform at least the following:
detect a shadow in a three-dimensional photo mesh including a building model;
remove the shadow from the three-dimensional photo mesh to form a modified photo mesh having a shadow-free texture;
receiving data indicative of a real-time condition;
receiving a time stamp for a current time;
simulate the real-time condition in the modified photo mesh;
calculate an artificial shadow based on the time stamp for the current time; and
render an image that shows an effect of the real-time condition and the artificial shadow.

16. The apparatus of claim 15 wherein the at least one memory and the computer program code are further configured to, with the at least one processor, cause the apparatus to perform at least the following:
determine a position of a light source;
create a directional shadow map based on the determined position;
test light visibility of a polygon of a texture of the three-dimensional photo mesh based on the directional shadow map;
map a vertex of the polygon to unique coordinates of the texture;
generate a shadow mask representing a shadowed area in the texture; and
output the shadow mask as an image.

17. The apparatus of claim 15 wherein the at least one memory and the computer program code are further configured to, with the at least one processor, cause the apparatus to perform at least the following:
separate a shadow region from a non-shadow region in a texture of the three-dimensional photo mesh;
compensate for illumination in the shadow region based on a neighboring non-shadow pixel;
compensate for color and/or texture in the shadow region based on a neighboring non-shadow pixel; and
smooth a boundary between the shadow region and the non-shadow region.

18. The apparatus of claim 15 wherein the at least one memory and the computer program code are further configured to, with the at least one processor, cause the apparatus to perform at least the following:
relight a scene to generate a shadow map for the modified photo mesh.

19. The apparatus of claim 15 wherein the at least one memory and the computer program code are further configured to, with the at least one processor, cause the apparatus to perform at least the following:
determine a position of a light source;
create a directional shadow map based on the determined position; test light visibility of a polygon of a texture of the three-dimensional photo mesh based on the directional shadow map;
map a vertex of the polygon to unique coordinates of the texture;
generate a shadow mask representing a shadowed area in the texture;
output the shadow mask as an image;
separate a shadow region from a non-shadow region in the texture;
compensate for illumination in the shadow region based on a neighboring non-shadow pixel;
compensate for color and/or texture in the shadow region based on a neighboring non-shadow pixel;
smooth a boundary between the shadow region and the non-shadow region; and
relight a scene to generate a shadow map for the modified photo mesh.

20. In a non-transitory computer-readable storage medium having stored therein data representing instructions executable by a programmed processor, the storage medium comprising instructions for:
detecting a shadow in a three-dimensional photo mesh;
removing the shadow from the three-dimensional photo mesh to form a modified photo mesh having a shadow-free texture;

simulating a plurality of real-time conditions in the modified photo mesh; and rendering an image that shows effects of the plurality of real-time conditions.

* * * * *